May 28, 1957 M. KADOSCH ET AL 2,793,494
JET NOZZLES AND JET PROPULSION UNITS PROVIDED WITH
MEANS FOR DEVIATING THE JET
Filed June 4, 1951 4 Sheets-Sheet 1
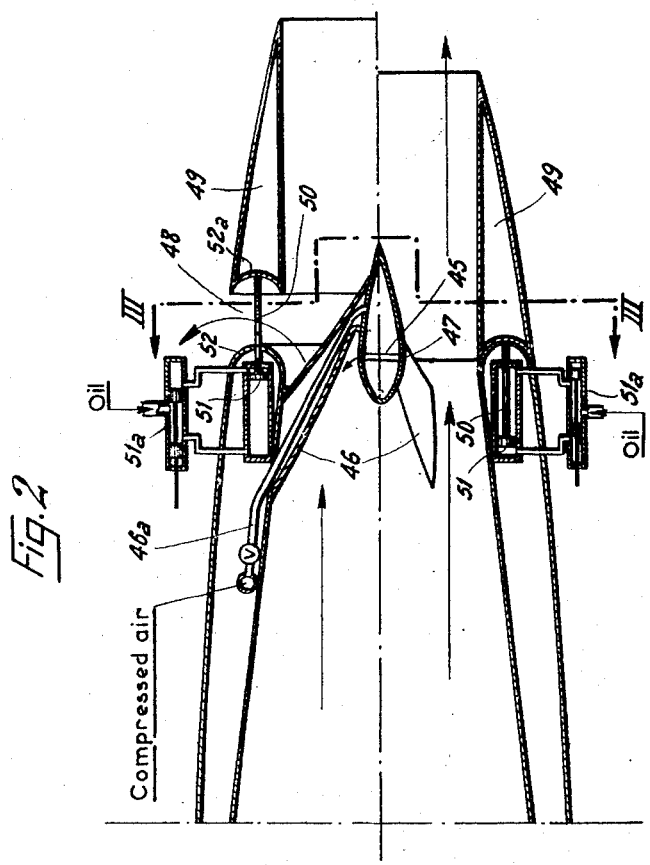
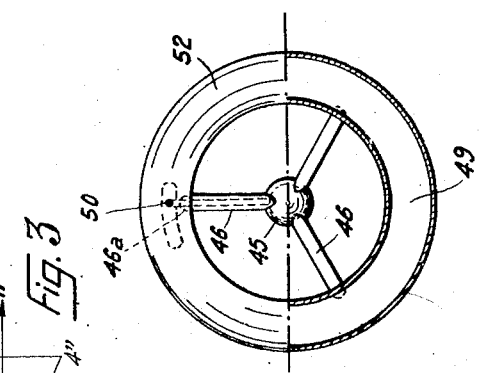
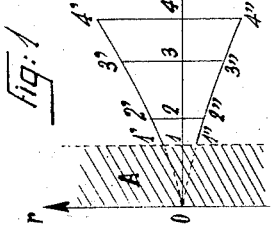

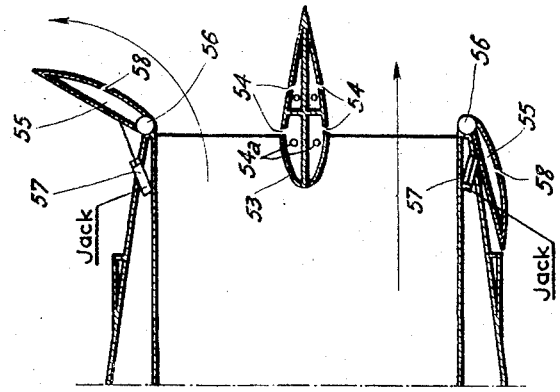
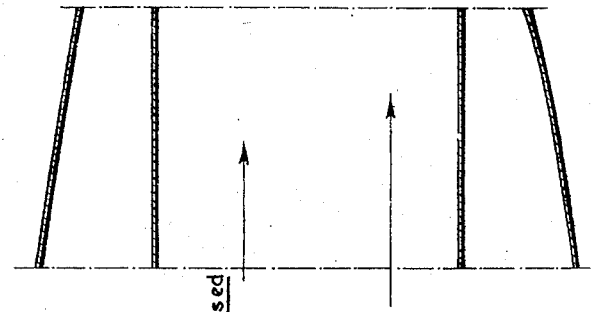
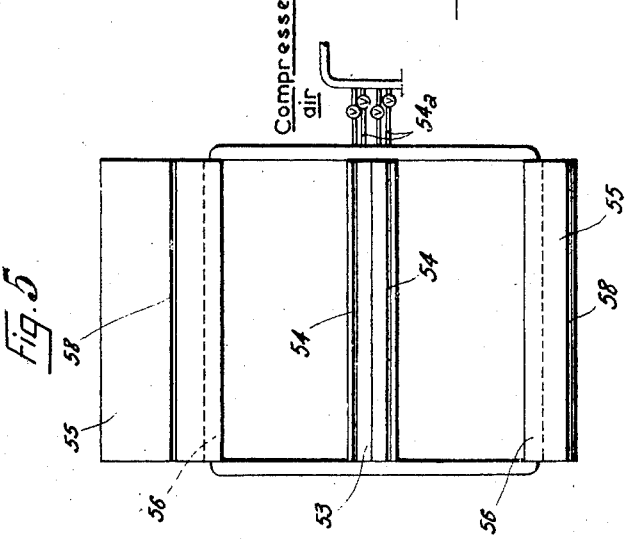

May 28, 1957 M. KADOSCH ET AL 2,793,494
JET NOZZLES AND JET PROPULSION UNITS PROVIDED WITH
MEANS FOR DEVIATING THE JET
Filed June 4, 1951 4 Sheets-Sheet 3
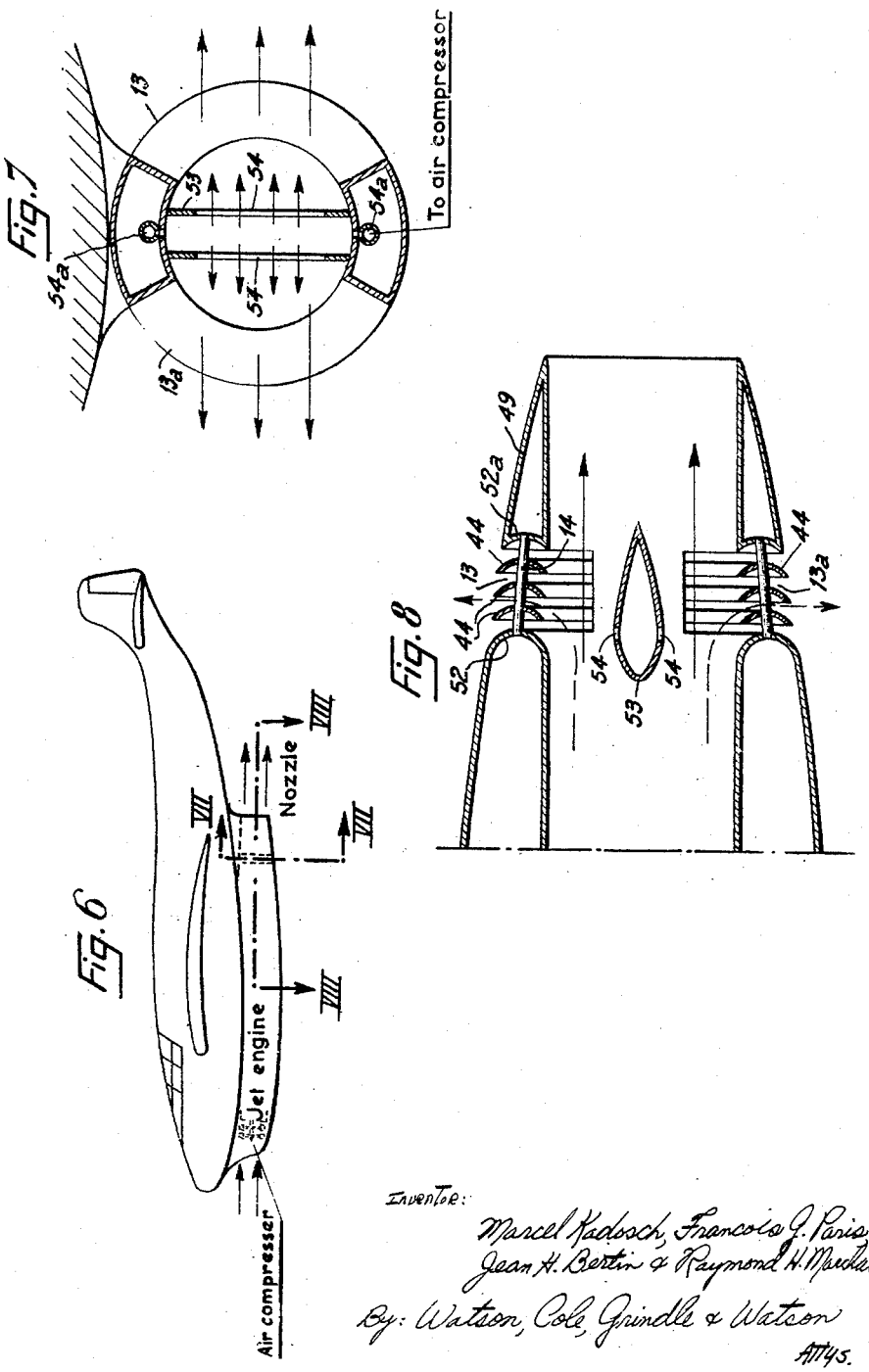

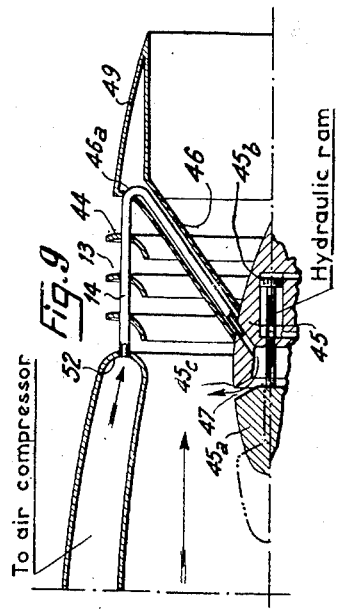
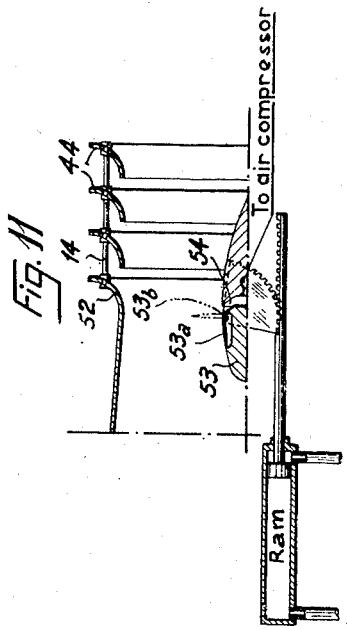
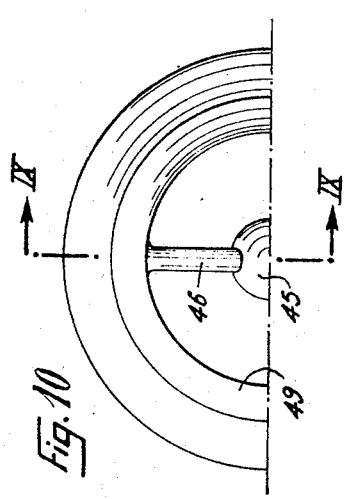
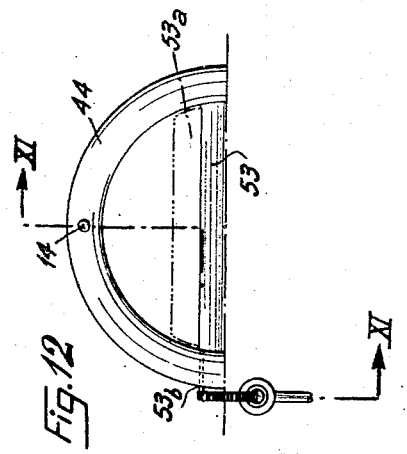

2,793,494

JET NOZZLES AND JET PROPULSION UNITS PROVIDED WITH MEANS FOR DEVIATING THE JET

Marcel Kadosch, Paris, François G. Paris, Chaville, Jean Bertin, Neuilly-sur-Seine, and Raymond H. Marchal, Paris, France, assignors to Societe Nationale d'Etude et de Construction de Moteurs d'Aviation, Paris, France, a company of France Application June 4, 1951, Serial No. 229,772

Claims priority, application France June 16, 1950

11 Claims. (Cl. 60—35.55)

The present invention relates to jet nozzles adapted for propulsion and lifting purposes; more particularly, it enables the design and the piloting of jet aircraft to be considerably simplified, but it is not limited to this application.

It consists essentially in the arrangement of various devices which are particularly simple and which enable the reaction gas jet or jets to be deflected from their normal direction in order to send them in one or several other directions, even in a direction which is opposite to the original direction, thus causing changes in the value and/or the direction of the thrust which may be of value when used in the jet-type engine.

The turbo-jet units actually employed in connection with aircraft have various defects, the principal cause of which is that the thrust of the jet unit cannot be eliminated in full flight except by completely extinguishing the combustion in the chambers of the jet unit, and the starting up again then becomes hazardous. Thus, a jet unit which is slowed down cannot give a thrust below a certain fraction, for example, one tenth of the normal thrust, without danger of being accidentally extinguished.

Even if the residual thrust of a throttled jet unit does not cause any inconvenience, the turbo-jet unit has another important defect; this is its lack of flexibility due to the great inertia of the compressor and turbine rotors turning at high velocity. Thus, the jet units most frequently employed require a time in the region of 10 seconds to pass from a throttled speed to a taking-off speed, instead of 2 or 3 seconds for a piston-type engine driving a propeller.

In addition, during flight at high altitude, when the compressor of the jet unit is utilized for pressurizing the interior of the aircraft, it is necessary to maintain a high speed of rotation in order to have a sufficient amount of pressure in the aircraft and consequently the throttled speed which is possible is more and more insufficient as the altitude increases.

These features of the turbo-jet units are shown diagrammatically by Figure 1 of the accompanying drawing, in which the values of the speed of rotation $n$ of a jet unit are indicated on the axis O$n$ and the thrust of this jet unit is shown on the axis O$r$, in such manner that the curve O, 1', 2', 3', 4' represents the normal variations of the thrust when $n$ increases. At speeds of rotation lower than that of the point 1, the jet unit is extinguished, this being shown by the hatched area A. The point 2 represents the speed below which it is dangerous to drop, the distance 1—2 being the safety margin and 2—2' being the residual thrust which is, for example, six hundredths of the maximum thrust 4—4'. The time necessary to accelerate from the speed 2 to the maximum speed 4, which is for example three times greater, is quite long, for example, 10 seconds.

These two defects, insufficient throttling and lack of flexibility, are particularly perceptible when diving and flattening out after a dive, to the point where any pronounced diving in jet-propelled air-craft is prevented. They are also very serious when landing, the aircraft becoming difficult to slow down because of the residual thrust, and difficult to re-accelerate if, at the last moment, the landing is inconvenienced due to a fortuitous cause.

These defects are found to a greater or lesser degree in the other main known types of jet units, such as ram jets and rockets. The invention makes it possible to obviate these defects and, moreover, to reduce or dispense with the accessory devices which are usually mounted on the aircraft, to avoid the defects of the jet-units.

In accordance with the invention, the jet nozzle is equipped with means enabling the reaction gas jet to be deviated from its normal direction of exhaust, thereby modifying instantaneously either the direction or the value of the thrust, or both at the same time.

The solution to the inadequacy of the slow running of the jet units and of the lack of flexibility results from the fact that, by the deviation of the jet carried out symmetrically, it is possible to eliminate all thrust of the jet unit in a very short time, although the jet unit still functions and may continue to function throughout the deviation at a high speed, which assists the instantaneous resumption, when necessary, of a powerful thrust by rendering inoperative the means which have caused the deviation.

The invention also renders it possible to direct or to disperse the reaction jet of an apparatus on the ground, which may be useful for safety reasons, both as regards personnel and the ground itself.

It also makes it possible, where a multiple jet aircraft is concerned, in the event of the stoppage of one or more of the engines, to compensate for the unsymmetrical operation of the engines which are still operating.

Finally, by means of an unsymmetrical deviation, the invention renders it possible to obtain directional or lifting effects which may be combined with the foregoing.

The invention also relates to simple and robust deviating means designed in such manner that no movable part having a large area is opposed to the normal jet and consequently is not subjected to any appreciable stress, and that, in addition, the jet may be deviated, either instantaneously in its entirety, or partially and progressively, the portion of the jet not deviated being, in this case, any suitable percentage of the total jet and remaining scarcely disturbed.

The invention is applicable to nozzles of various forms, for example, of rectangular, circular or annular section, and to nozzles of variable section.

The description which follows with reference to the accompanying drawing, given simply by way of example, will enable it to be understood how the invention may be carried into effect, the features which are apparent from the drawing and from the description obviously forming part of the invention.

Figure 1 is an explanatory diagram already partly used in the introduction in order to illustrate the defects of the known jet units.

Figure 2 is a diagrammatic axial section of a nozzle equipped with a device in accordance with the invention;

Figure 3 is a section taken along the line III—III of Figure 2;

Figures 4 and 5 are respectively an axial section and an end view of a modification;

Figure 6 is a diagrammatic elevational view of a jet propelled aircraft;

Figures 7 and 8 are sections, on an enlarged scale, on the lines VII—VII and VIII—VIII of Figure 6;

Figures 9-10 and 11-12 illustrate two modifications, Figures 9 and 11 being sections taken along the lines IX—IX and XI—XI of Figures 10 and 12, respectively, which are end views.

In the example illustrated by Figures 2 and 3, the jet nozzle is circular and comprises, on its axis, a tapered member 45 carried by arms 46. This tapered member is hollow and is formed at 47 with a circular slot through which it is possible to eject into the nozzle, in a suitable direction more or less normal to the axis, compressed air being supplied by a pipe 46a and derived, for example, from the jet unit compressor, in order to cause the deviation of the jet. The deviated jet leaves through the annular orifice 48 which has previously been opened on the wall of the nozzle by displacing, towards the rear, the rear portion 49 of the said nozzle (see the top half of Figure 2). The part 49 is provided with any suitable means for this purpose. The drawing shows it carried by sliding rods 50 which are acted upon by the movable rams 51 of hydraulically-operated jacks under the control of pilot valves 51a. The deflecting walls 52 and 52a have a curvature suitable for producing the desired angle of deviation of the jet. In the position of the rear annulus 49 corresponding to the normal use of the jet for propulsion purposes (lower half of Figure 2), no projection exists and thus the arrangement does not provide any drag.

When the arrangement is in the position shown in the upper half of Figure 2, as the deviated jet issues through the annular passage 48 which extends completely around the nozzle, the propulsive thrust is then suddenly cut out without the deviated jet producing any kind of radial reaction component.

It will be seen by referring to the diagram of Figure 1 that with a normal jet unit, the slowing down for landing, for example, would have necessitated the reduction of the running of the jet unit from the operational point 4 or 3, for example, to the point 2, thus reducing the thrust from its value 4—4' or 3—3' to the value 2—2' constituting the troublesome residual thrust, the arrangement described enables the thrust to be instantaneously cut out, for example, to the point 2 or to any desired point, while maintaining the jet unit at the corresponding rate. The landing operation thus becomes simple and if, for any reason it is necessary for the pilot to accelerate at the last minute, he has the means for doing this immediately at the running speed of the jet unit which he has maintained by actuating the valve of pipe 46a so as to cut off supply of compressed air. For example, if the thrust has been reduced to the point 3 by keeping the jet unit running at the rate corresponding to this point, the cutting off of compressed air would enable the thrust 3—3' to be immediately obtained again.

The thrust may also be reduced to any rate whatsoever in order to improve the flexibility.

If the discharge orifice 48 is disposed in such manner as to deflect the deviated jet towards the front of the aircraft, which may be effected by a sufficiently inwardly curved shape of the walls 52 and 52a, in such manner that the tangent to their section at the outlet is directed towards the front, or by means of movable deflector flaps which are placed externally of the orifice and which are actuated at a suitable moment, it is possible not only to reduce the thrust, as has already been explained, by feeding compressed air to the slot-like nozzle 47, but also to obtain a negative thrust producing a braking action, the slowing down at the time of landing thus being accompanied by a braking which is very favorable to a rapid landing. This result is illustrated in Figure 1 by the curve 1", 2", 3", 4" representing, for each rate of operation of the jet unit, the negative thrusts which may be obtained with a suitable value of the deviation in the orifice 48. If the jet unit is, for example, at the rate of operation indicated by the point 3, it is seen that by deviating the jet, it is possible to pass from the propelling thrust 3—3' to the negative braking thrust 3—3". It is thus possible to follow on the diagram of Figure 1, paths such as 4', 3', 3, 3" or 4', 3', 2', 2, 2" in order to produce a braking of the force desired, which may or may not be followed by a rapid acceleration, the acceleration being more or less rapid, depending upon how close the point indicating the rate of operation at which the thrust is cut out or reversed is to the point 4 representing maximum running. Naturally, the braking becomes more and more effective as the orifice 48 is formed to give an angle of deviation closer to 180°.

It should also be noted that the arrangement shown in Figures 2 and 3 with the walls 52, 52a curved sufficiently inwards to permit a return of the jet towards the front makes it possible to graduate, as has already been seen, the reduction of the thrust for a given rate of the jet unit and also the reversal of this thrust for the braking action.

Actually, if the deviation of the jet is complete through the orifice 48 for a full supply of compressed air to the slot-like nozzle 47, so that the jet returned towards the front produces an intense braking action, the result of reducing the supply of compressed air is that only a part of the jet is deviated by the orifice 48 in producing a negative thrust, while the remainder of the jet continues to leave axially from the rear part of the nozzle, giving a positive thrust.

By suitably regulating, through the control device 46b, the flow of compressed air through pipe 46a, it is possible to obtain a positive value, a zero value or a negative value for the resultant of the positive thrust and the negative thrust. The device is thus very flexible.

Figures 4 and 5 respectively show an axial section and a rear view of a rectangular jet nozzle. A tapered cylindrical member 53 carrying two pairs of two symmetrical slots 54 adapted to cause the deviation by a blast of compressed gas acting in opposition to the normal jet, such gas being derived, for example, from the jet unit compressor through two pairs of pipes 54a controlled by valve 54b, is disposed towards the rear of the nozzle in its horizontal plane of symmetry. The slots 54, situated mainly downstream, are intended to deviate the jet when it is slowed down. Each slot only acts on the portion of the jet which is on the same side, this action being all the greater as the pressure applied to the forced gas is increased. When the supply tubes for the slots are separate (which is the case in Figure 4), it is thus possible to obtain deviations of the desired intensity, which may or may not be unsymmetrical.

The deviated jet leaving the nozzle acts on the deviating flaps 55, which may be pivoted at 56 so that they may be folded by means of jacks 57. The upper flap 55 is shown in the deviating position and the lower flap 55 in the folded position, reducing the drag in normal flight. These flaps may be formed with suction slots 58 for the limiting layer so as to assist the adherence of the jet to the wall. For this suction effect, it is possible to employ a part of the intake of the jet unit compressor, this being reinforced as required by reducing the section of the air inlet to the jet unit.

Figure 6 makes clear the usefulness of the orientation of the deviation of the jet in a predetermined direction. This figure shows, by way of example, an outline view of an aircraft equipped with a jet propulsion unit disposed underneath the fuselage. It is seen that it is desirable to avoid a deviation of the jet in an upward direction, because the hot gases could then damage the rear portion of the aircraft and the rudders. The deviation is thus effected on two sides of the plane of Figure 6. To this end, the arrangement of Figures 4 and 5 will be adopted in the case of a rectangular section nozzle with the tapered member 53 disposed vertically. Figures 7 and 8 illustrate the application to a circular nozzle, in the case of an aircraft according to Figure 6, of an arrangement similar to that described with reference to Figures 4 and 5. The tapered member 53 is disposed vertically in the vertical plane of symmetry of the nozzle, a little upstream of the two outlet orifices 13 and 13a of the deviated jet, formed on circular arcs on the casing of the jet unit and equipped with deflector vanes such as 44. The tapered member 53 is formed with symmetrical slots 54 through which it is possible to blow compressed air coming from a tube 54a in conjunction with, for example, the compression of air from the compressor of the jet unit. By means of this blast of compressed air, the pilot will obtain, when he so desires, the deviation of the air jet towards the symmetrical orifices 13 and 13a and consequently the cutting out of the thrust without any risk of the rear portion of aircraft being damaged.

The arrangement described is obviously only given by way of example. For each type of aircraft having a particular mounting of the jet unit or units, it will be possible to arrange the discharge orifices of the deviated jet in such manner that the deviated jet has no harmful effect.

It is to be noted that when the deviation of the jet is effected by blast of compressed air arriving from the compressor of the jet unit and when the jet unit is slowed down progressively at the same time, for example, for a landing, the pressure of the compressed air decreases progressively. It follows that the deviation effect may suddenly cease when the pressure of the air compressed by the compressor drops below a certain value, although the thrust which the jet unit is capable of supplying is still considerable. There may therefore be a certain danger in the manoeuvre. It is possible to lessen this danger by adding movable deviating barriers or baffles to the air blast deviating means, which baffles will be removed above a certain speed of rotation of the jet unit and caused to project to take the place of the blast, which loses its strength below a certain jet unit speed.

Figures 9 and 10 show an embodiment of this nature applied to a circular reaction nozzle which is provided on its axis with a tapered member 45 similar to that described in Figures 2 and 3, with a circular blast slot 47 supplied by a tube 46a for deviating the jet through the annular orifice 13. The front part 45a of the body is movable axially, its movement being adapted to be controlled, for example, by a hydraulic servo-motor 45b mounted in the fixed part. When the said part 45a is displaced to bring it into the position shown in broken lines, the sharp edge 45c of the slot 47 forms an obstacle intercepting central streamlines of the jet flowing in the direction of the arrow and the effect of this obstacle is to deflect the jet laterally towards the side passages 13. Thus, this sharp edge 45c is substituted, as regards action on the jet, to the failing blast provided through 46a.

The modified embodiment shown in Figures 11 and 12 corresponds to the example of Figures 9 and 10 and is designed to deviate the jet through the lateral orifices 13. The tapered member 53 comprises two flaps 53a hinged at 53b. These flaps may either occupy the position shown in full lines, in which they form a continuation of the surface of the member 53, or they project in the position shown in broken lines, when the blast becomes inadequate, in order to act as a baffle deviating the jet towards the orifices 13.

It is obvious that the embodiments described have only been given as examples in order to illustrate the possibilities of the invention, and that the various mechanisms and processes described could be transposed.

They are generally applicable to nozzles having a section of any shape.

What we claim is:

1. In a jet propulsion unit for aircraft and like vehicles, having a propulsive nozzle designed for forming an axially-flowing jet when supplied with motive gaseous fluid, a device for deflecting said jet from the axis of said nozzle comprising jet guiding means extending laterally of the path of said axially-flowing jet and providing an exhaust curved path for said fluid so as to form a secondary jet at a substantial angle with said axis, a generally stationary support inside said nozzle opposite said guiding means and spaced therefrom so as to provide a substantially unobstructed passageway for the flow of fluid through said nozzle past said support, controllable obstacle forming means on said support opposite said guiding means for urging said flow towards said guiding means, said obstacle forming means being adapted for leaving smooth the outer surface of said support when they are out of action and for intercepting some of the streamlines of the fluid without obstructing the greatest part of said passageway when they are in action, and control means for putting said obstacle forming means in and out of action.

2. The combination as claimed in claim 1, wherein the guiding means includes a convex, outwardly curved surface smoothly merging with and tangent to the wall of the nozzle.

3. The combination as claimed in claim 1, wherein the support has an airfoil cross-section and is in the shape of a revolution body arranged coaxially with respect to the nozzle.

4. The combination as claimed in claim 1, wherein the support has an airfoil cross-section and extends transversely of the nozzle between opposite points of the wall thereof.

5. The combination as claimed in claim 4, wherein the nozzle is of circular cross-section and the support extends along a diameter thereof.

6. The combination as claimed in claim 2, wherein the convex surface is pivotally fitted on the wall of the nozzle.

7. The combination as claimed in claim 6, wherein the convex surface is fitted at the outlet end of the nozzle.

8. In a jet propulsion unit for aircraft and like vehicles, having an air compressor and a propulsive nozzle designed for forming an axially-flowing jet when supplied with motive gaseous fluid, a jet deflecting device comprising jet guiding means extending laterally of the path of said axially-flowing jet and providing a secondary exhaust path for said jet at a substantial angle with the former mentioned path, and controllable air injecting means connected with said air compressor and opening into said former mentioned path, for forming, when supplied with air under pressure from said air compressor, an auxiliary jet intercepting some of the streamlines of the axially flowing jet and urging same towards said jet guiding means.

9. In a jet propulsion unit for aircraft and like vehicles, having an air compressor and a propulsive nozzle designed for forming an axially-flowing jet when supplied with motive gaseous fluid, a jet deflecting device comprising jet guiding means extending laterally of the path of said axially-flowing jet and providing a secondary exhaust path for said jet at a substantial angle with the former mentioned path, and auxiliary nozzle means connected with said compressor and supplied with air discharged therefrom, said auxiliary nozzle means being operatively associated with said jet guiding means and opening into said former mentioned path in a general crosswise direction with respect thereto, for forming a screen-like air jet generally across a path of said former mentioned path whereby the jet formed by said propulsive nozzle is urged towards said jet guiding means.

10. The combination as claimed in claim 9, further comprising controllable obstacle forming means located in the vicinity of the auxiliary nozzle means and operatively associated with the jet guiding means, said obstacle forming means being adjustable to an operative condition wherein it forms a physical bluff surface intercepting part of the axially-flowing jet and to an inoperative condition wherein it does not substantially affect said jet.

11. The combination as claimed in claim 10, wherein the obstacle forming means comprises a pivotal flap member adjustable to an operative, protruding position and to an inoperative, retracted position.

(References on following page)

References Cited in the file of this patent

UNITED STATES PATENTS

| | | |
|---|---|---|
| 2,418,488 | Thompson | Apr. 8, 1947 |
| 2,620,622 | Lundberg | Dec. 9, 1952 |
| 2,620,623 | Imbert | Dec. 9, 1952 |
| 2,630,673 | Woll | Mar. 10, 1953 |

FOREIGN PATENTS

| | | |
|---|---|---|
| 50,033 | France | Aug. 1, 1939 |
| 244,761 | Switzerland | June 2, 1947 |
| 600,075 | Great Britain | Mar. 31, 1948 |